R. GUILLERY.
COMPENSATION DEVICE FOR VEHICLE SUSPENSION.
APPLICATION FILED MAR. 25, 1913.

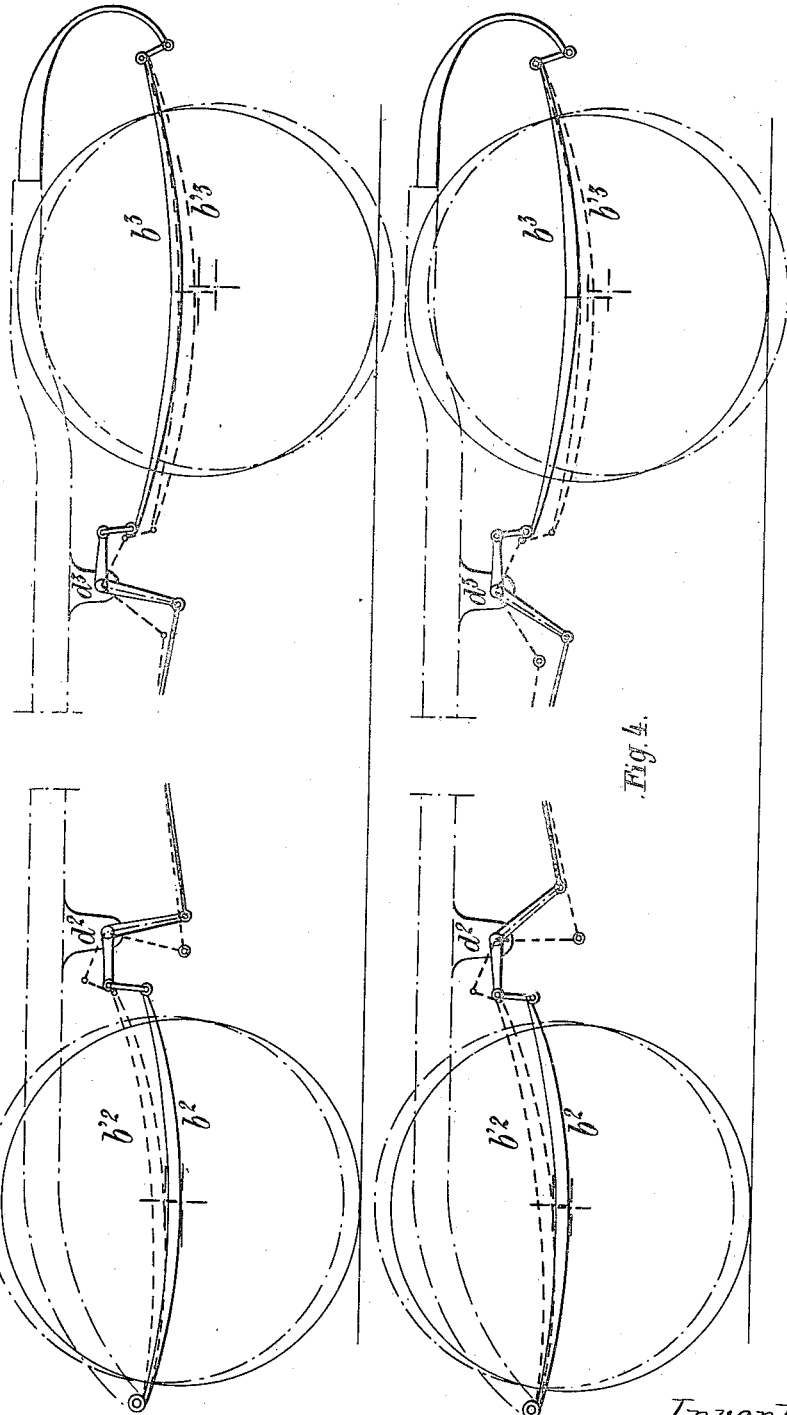

1,075,415.

Patented Oct. 14, 1913.

2 SHEETS—SHEET 1.

Attest:
Ewd L. Tolson
C E Parsons.

Inventor:
René Guillery,
by Spear Middleton Donaldson & Spear
Attys.

UNITED STATES PATENT OFFICE.

RENÉ GUILLERY, OF AUBERVILLIERS, FRANCE, ASSIGNOR TO SOCIÉTÉ DES ETABLISSEMENTS MALICET ET BLIN, OF AUBERVILLIERS, FRANCE.

COMPENSATION DEVICE FOR VEHICLE SUSPENSION.

1,075,415.  Specification of Letters Patent.  Patented Oct. 14, 1913.

Application filed March 25, 1913. Serial No. 756,757.

*To all whom it may concern:*

Be it known that I, RENÉ GUILLERY, a citizen of the French Republic, and residing at 103 Avenue de La Republique, Aubervilliers, France, have invented a certain new and useful Compensation Device for Vehicle Suspension, of which the following is a specification.

It is known that there have already been produced compensation devices for suspension of vehicles which have more particularly for their object to distribute over the whole of the springs of the vehicle, the additional load which is imposed on one of them when one of the wheels of the corresponding axle is exposed to a sudden movement due for instance to meeting an inequality in the road.

This invention has for its object a special compensation device of this kind more particularly characterized by the distribution of the movements, and consequently of abnormal positive or negative stresses on any one of the suspension springs, being effected by a double funicular system, symmetrical relatively to the longitudinal axis of the car frame and coöperating with pivoted levers and guide rollers insuring the working of cables which connect together respectively the corresponding ends of all other springs.

Figure 1:
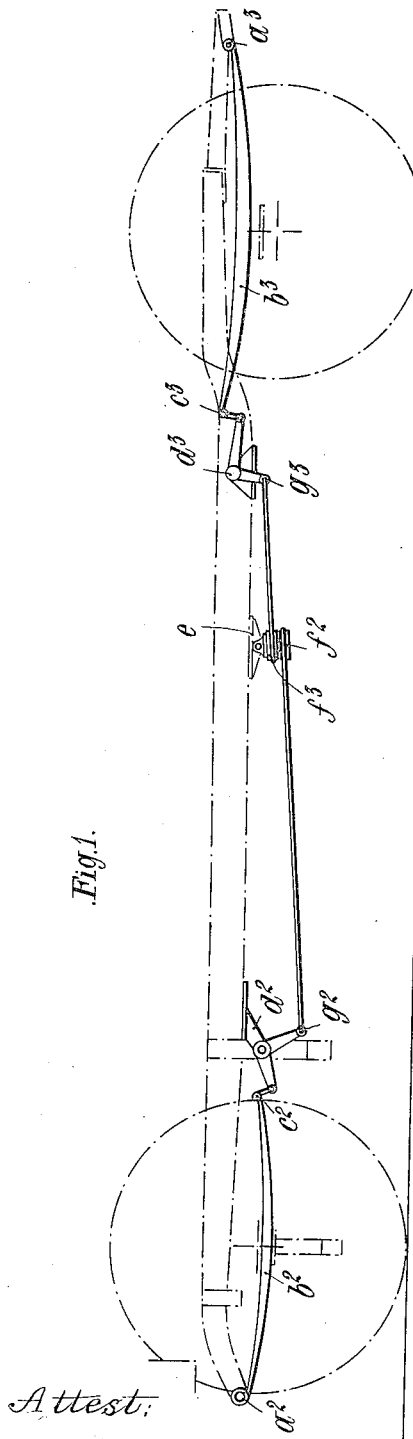
Figure 2:
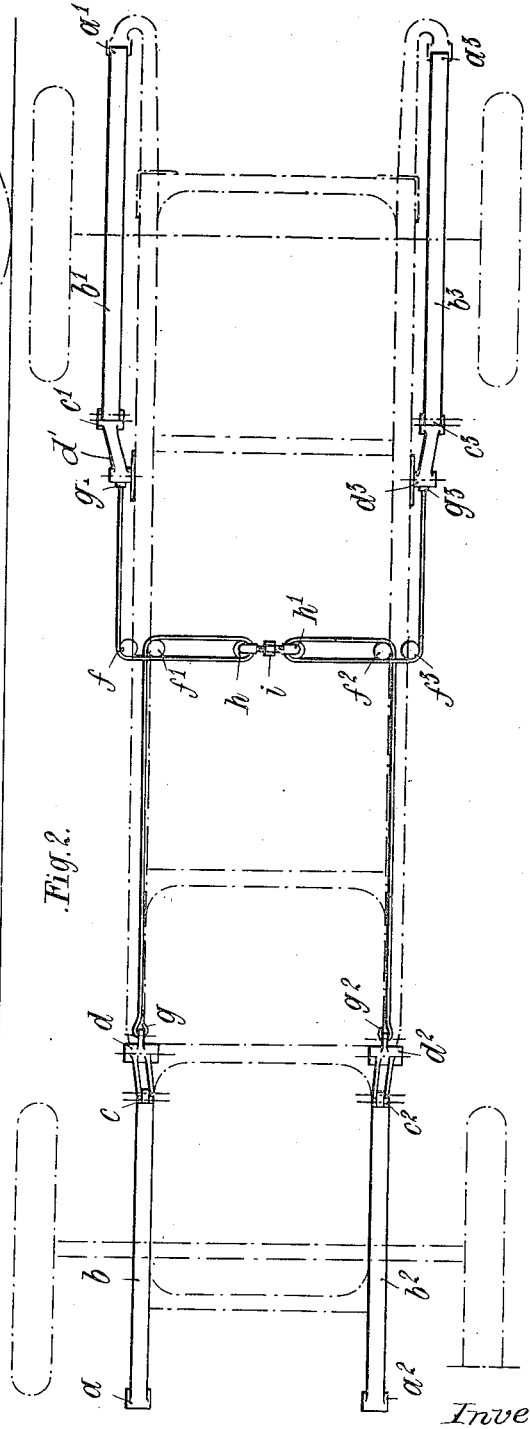

In the accompanying drawing given by way of example, Figure 1 shows in elevation a car frame provided with funicular compensation device forming the subject of the present invention, Fig. 2 being a corresponding plan. Figs. 3 and 4 show diagrammatically the conditions of stability of this system of suspension.

According to this invention, each of the four springs is connected directly to the frame with one of its ends $a$ $a^1$ $a^2$ $a^3$. It is secured to the wheel train at its center $b$ $b^1$ $b^2$ $b^3$ and pivoted at its other end $c$ $c^1$ $c^2$ $c^3$ to a two-armed lever $d$ $d^1$ $d^2$ $d^3$, the angle of which is suitably calculated for avoiding unstable equilibrium of the system. The center of articulation of the lever is secured to the frame of the vehicle.

At each side of the frame is secured a bracket as shown for example at $e$ carrying two grooved pulleys $f$ $f^1$ and $f^2$ $f^3$ mounted on balls, the spindles of the said pulleys being arranged at a suitable angle.

A flexible cable connects together the ends $g$ and $g^1$ of the double levers $d$ $d^1$, passing on the one hand over the grooved pulleys $f$ and $f^1$, and on the other hand over a pulley $h$ which is nearer to the center of the vehicle. Another cable going from $g^2$ to $g^3$, passes over the pulleys $f^2$ and $f^3$ and over a pulley $h'$.

The two grooved pulleys $h$ and $h'$ are connected together by a double shackle $i$ supporting their pins, the length of which can be adjusted at will by a device acting as a turn-buckle. For a given position the tensions in the cables are in equilibrium. This tension is practically the same for the two cables, this being due to the method of their connection.

If one of the wheels meets an obstacle or a hollow in the road, it rises or sinks to the height of the said obstacle or of the hollow, bringing about by the action of its spring on the end of the corresponding double-armed lever, a positive or negative variation of stress which is transmitted by the cable to the three other levers which at the same time cause the three other springs to act. This results in a considerable reduction of the individual stresses on the springs, on the one hand, and in a reduction in disturbances which the obstacle would have transmitted to the frame through a single spring.

It is necessary to bear in mind that the angle of the vertical arms of the levers with the mean direction of the cables, plays an important part in the working of the suspension. In fact, if Fig. 3 is considered—in which the vertical arms make with the cables an angle equal to, or very near, 90°, it will be seen that when the front wheel, for instance, meets an obstacle, the spring $b^2$ moves and arrives at $b'^2$. The lever pivoted at $d^2$ assumes the position shown dotted. The lever pivoted at $d^3$, which is connected to the preceding one by the cable, also takes up the position shown dotted. In order that the suspension should produce a good result it is obviously necessary that, as soon as the obstacle is passed, the system should resume its relative initial positions. The return forces of the two pivoted systems, vary therefore in the same direction, and as will be readily seen from the drawing, to practically the same amounts. If the system is in equilibrium in its initial positions (which is a normal case), it follows that it will still be in equilibrium in its new positions which it has reached for the compensation. The system is therefore not submitted to any effort tending to bring it back to its original positions. The equilibrium is similar to the indifferent equilibrium of a balance.

The diagram in Fig. 4 shows a form in which the angles of the levers with the cables are different, being greater than a right angle.

If the equilibrium is obtained in the position of the levers shown in full lines, it will be seen that, when the shock has brought them into the position shown in dotted lines, the moment of the return forces, will have increased for one of the systems, and decreased for the other. The equilibrium will be therefore broken, which will produce an effort tending to bring the various parts of the suspension to their initial relative positions.

It is necessary that the suspension should comply with the above mentioned conditions for insuring good working. The grooved pulleys can be protected by a sheath forming a stay for the frame. The cable could be replaced in straight parts by rods, and in the portions passing over pulleys, by chains. Brake devices or pneumatic or spring-controlled shock absorbers for reducing oscillations can be employed. It must also be pointed out that in case of the cables breaking, the suspension would work like an ordinary spring suspension.

What I claim as my invention and desire to secure by Letters Patent is:—

1. In a funicular compensating device for the suspension systems of vehicles, the combination with hangers on the frame, of double levers pivoted to the said hangers for supporting with one of their arms and, by means of shackles, the corresponding ends of the springs, cables connecting respectively the other arms of the double levers arranged on one and the same side of the vehicle, and means for connecting together the said cables.

2. In a funicular compensating device for the suspension systems of vehicles, the combination with hangers on the frame, of double levers pivoted to the said hangers for supporting by means of shackles the corresponding ends of the springs, cables arranged longitudinally of the frame and having their ends secured to the arms of the double levers arranged on one and the same side of the vehicle, and means for connecting together the longitudinal cables transversely of the frame.

3. In a funicular compensating device for the suspension systems of vehicles, the combination with hangers on the frame, of double levers pivoted to the said hangers for supporting by means of shackles the corresponding ends of the springs, cables arranged longitudinally relatively to the frame and having their ends secured to the arms of double levers arranged on one and the same side of the vehicle, guide pulleys for each of the cables so as to form loops which are arranged transversely of the frame, pulleys adapted to maintain the loops properly stretched and adjustable means for connecting together the said tension pulleys.

4. In a funicular compensating device for the suspension systems of vehicles, the combination with hangers on the frame, of double levers pivoted to the said hangers for supporting by means of shackles the corresponding ends of the springs, cables arranged longitudinally relatively to the frame and having their ends secured to the arms of double levers arranged on one and the same side of the vehicle, guide pulleys for each of the cables, adapted to form loops arranged transversely of the frame, a bracket for each of the said guide pulleys, tension pulleys arranged at either side of the longitudinal plane of symmetry of the frame for maintaining the loops of the cables properly stretched, shackles for the said pulleys and a turn-buckle between the said shackles.

5. In a funicular compensating device for the suspension systems of vehicles, the combination with hangers on the frame, of double levers pivoted to the said hangers for supporting by means of shackles the corresponding ends of the springs, cables arranged at either side of the frame and having their ends secured to the arms of double levers arranged at the same side of the vehicle, guide pulleys for each of the cables adapted to form loops arranged transversely of the frame, brackets secured to the frame, pins pivoted to the said brackets adapted to support guide pulleys having grooves arranged in the direction of the corresponding section of the cable, fixed pulleys arranged at either side of the longitudinal plane of symmetry of the frame, for the purpose of maintaining the loops of the cables suitably stretched, shackles for the said pulleys, and a turn-buckle between the said shackles.

6. In a funicular compensating device for the suspension systems of vehicles, the combination with hangers on the frame, of double levers pivoted to the said hangers for supporting by means of shackles the corresponding ends of the springs, cables arranged at either side of the frame and having their ends secured to the arms of said double levers, and making angles therewith greater than 90°, guide pulleys for each of the said cables adapted to form loops arranged at a right angle to the longitudinal axis of the frame, brackets secured to the frame, pins pivoted to the said brackets adapted to support guide pulleys, having grooves arranged in the direction of the corresponding section of the cable, tension pulleys arranged at either side of the longitudinal plane of symmetry of the frame for maintaining the loops of the cables properly stretched, shackles for the said pulleys and a turn-buckle between the said shackles.

In testimony whereof I have signed my name to this specification in the presence of two subscribing witnesses.

RENÉ GUILLERY.

Witnesses:
 VICTOR DUPONT,
 GEORGES BONNEUIL.